(12) United States Patent
Hannebauer

(10) Patent No.: US 7,377,376 B2
(45) Date of Patent: May 27, 2008

(54) LUMBER POSITIONING SYSTEM

(75) Inventor: James B. Hannebauer, Salmon Arm (CA)

(73) Assignee: Mill Tech Industries, Salmon Arm (CA)

( * ) Notice: Subject to any disclaimer, the term of this patent is extended or adjusted under 35 U.S.C. 154(b) by 89 days.

(21) Appl. No.: 11/419,451

(22) Filed: May 19, 2006

(65) Prior Publication Data
US 2006/0260454 A1 Nov. 23, 2006

Related U.S. Application Data

(60) Provisional application No. 60/682,391, filed on May 19, 2005.

(51) Int. Cl.
*B65G 47/24* (2006.01)
(52) U.S. Cl. ............... 198/407; 198/456; 198/413; 83/407
(58) Field of Classification Search ........... 198/341.05, 198/456, 416, 412, 413, 597; 83/407, 732, 83/75.5, 76.8, 435.2
See application file for complete search history.

(56) References Cited

U.S. PATENT DOCUMENTS

| | | | |
|---|---|---|---|
| 2,253,453 A * | 8/1941 | Van Deinse | 83/407 |
| 2,778,474 A * | 1/1957 | De Koning | 198/456 |
| 3,033,341 A * | 5/1962 | Cromeens | 198/456 |
| 4,231,460 A * | 11/1980 | Heikinheimo | 198/456 |
| 5,381,712 A * | 1/1995 | Head et al. | 83/418 |
| 5,865,080 A | 2/1999 | Jackson | |
| 5,911,302 A | 6/1999 | Jackson | |
| 6,173,829 B1 * | 1/2001 | Jackson et al. | 198/456 |
| 6,311,828 B1 * | 11/2001 | Newnes et al. | 198/456 |
| 6,382,067 B1 | 5/2002 | Gagnon | |
| 6,651,798 B2 | 11/2003 | Newnes et al. | |
| 6,705,190 B2 | 3/2004 | Newnes et al. | |

\* cited by examiner

*Primary Examiner*—James R Bidwell
(74) *Attorney, Agent, or Firm*—Oyen Wiggs Green & Mutala LLP

(57) ABSTRACT

A positioning system can position lumber to be cut while the lumber is traveling on a transfer deck. The positioning system has end stops that circulate at the same rate as the transfer deck. The end stops each have a locking mechanism that is triggered when the end stop passes an actuating member. A controller positions the actuating member so that the locking mechanism will lock the position of the end stop when the end stop is in a desired position.

30 Claims, 10 Drawing Sheets

SCHEMATIC - NOT TO SCALE

LUMBER POSITIONING SYSTEM

CROSS-REFERENCE TO RELATED APPLICATION

This application claims the benefit of U.S. patent application Ser. No. 60/682,391 filed on 19 May 2005 and entitled LUMBER POSITIONING SYSTEM under 35 U.S.C. §119. U.S. patent application Ser. No. 60/682,391 is hereby incorporated herein by reference.

TECHNICAL FIELD

This application relates to systems for positioning lumber and other elongated objects. The invention has application to positioning lumber so that the lumber can be cut at a desired location by a trim saw.

BACKGROUND

In lumber mills it is often necessary to trim pieces of lumber. For example, some boards may have defects at their ends. It is desirable to trim the boards to cut off the defects. There exist various control systems for determining where a board should be cut to remove defects while optimizing the value of the board. Such systems can be connected to a lumber positioning system upstream from a trim saw. The lumber positioning system positions each board at a longitudinal position determined by the control system so that the trim saw will cut the board at one or more desired locations.

Examples of lumber positioning systems are described in the following patents:
U.S. Pat. No. 6,311,828 (Newnes et al.)
U.S. Pat. No. 6,651,798 (Newnes et al.)
U.S. Pat. No. 6,705,190 (Newnes et al.)
U.S. Pat. No. 6,173,829 (Jackson et al.)
U.S. Pat. No. 5,865,080 (Jackson)
U.S. Pat. No. 5,911,302 (Jackson)
U.S. Pat. No. 6,173,829 (Jackson et al.)
U.S. Pat. No. 6,382,067 (Gagnon)

By and large, existing lumber positioning systems include some mechanism for moving lumber coupled control mechanisms that react in real time to stop the lumber from moving from the desired position.

It is generally desirable to operate lumber mills at higher speeds than have been prevalent in the past. Current mechanisms have reached the limit where higher speeds are not practical due to the response times of mechanical components and the limitations imposed by physics on the designs. At high speeds the times taken for actuators to move to positions dictated by control systems become significant. This limits the rate at which such mechanisms can operate.

There is a need for alternatives to existing lumber positioning systems. There is a particular need for cost-effective systems for positioning lumber and similar objects that can operate accurately while the objects are being moved quickly.

SUMMARY

One aspect of the invention provides apparatuses for positioning objects that are extended in a longitudinal direction. For example, the apparatuses may be apparatuses for positioning lumber in a sawmill. An apparatus according to an example embodiment comprises a conveyor for carrying the elongated objects in a conveyor direction generally transverse to the longitudinal direction. The conveyor comprises a lugged transfer chain in some embodiments.

A guide mechanism is disposed to interact with one of the elongated objects as the elongated object is moved in the conveyor direction. In some embodiments the guide mechanism comprises an end stop, clamp, or the like that limits motion of the elongated object in the longitudinal direction. The guide mechanism has a first mode wherein the guide mechanism sets a longitudinal position for the object. In the first mode, the longitudinal position set by the guide mechanism is a function of a position of the object in the conveyor direction.

The guide mechanism has a second mode wherein the longitudinal position for the object set by the guide mechanism does not change as the object moves in the conveyor direction. The guide mechanism comprises a switch mechanism connected to switch the guide mechanism from the first mode to the second mode. The switch mechanism moves along a path as the object moves in the conveyor direction. An actuating member is located to interact with the switch mechanism at a point that is movable along the path of the switch mechanism. The position of the actuating member along the path determines a location at which the switch mechanism operates to switch the guide mechanism from the first mode to the second mode.

In some embodiments, the guide mechanism comprises a plurality of stop members spaced apart from one another in the conveyor direction and carried on a circulating member, such as a chain, adjacent to the conveyor. The stop members are each movable in the longitudinal direction. A drive is connected to drive the circulating member to carry the plurality of stop members in the conveyor direction at a rate substantially equal to a rate at which the conveyor carries the object in the conveyor direction. The switch mechanism comprises a first one of a plurality of independent switch mechanisms, each corresponding to one of the stop members. The actuating member comprises one of a plurality of independently-movable actuating members each corresponding to one of the switch mechanisms. The apparatus comprises a plurality of locking mechanisms, one of the locking mechanisms associated with each of the stop members. The locking mechanisms are operable to lock motion of the corresponding stop member in the longitudinal direction upon actuation of the corresponding switch mechanism by interaction with the corresponding actuating member.

In some embodiments, the guide mechanism comprises: a cam follower; a bias mechanism urging the cam follower against a cam surface; and, a mechanism for moving the cam follower in the conveyor direction. In some such embodiments, motion of the cam follower in the conveyor direction tends to move the cam follower away from the cam surface.

Another aspect of the invention provides apparatus for positioning objects that are extended in a longitudinal direction. The apparatus comprises a conveyor for carrying the elongated objects in a conveyor direction generally transverse to the longitudinal direction and a guide mechanism disposed to interact with one of the elongated objects as the elongated object is moved in the conveyor direction. The guide mechanism has a first mode wherein the guide mechanism moves the object longitudinally along a trajectory such that a longitudinal position of the object is a predetermined function of a position of the object in the conveyor direction. The guide mechanism also has a second mode wherein the guide mechanism does not move the object longitudinally. The guide mechanism comprises a switch mechanism connected to switch the guide mechanism from the first mode to the second mode. At least the switch mechanism moves in the conveyor direction at the same rate as the object. An actuating member is located to interact with the switch mechanism and is movable in the conveyor direction. The position of the actuating member in the conveyor direction determines a location at which the switch mechanism operates to switch the guide mechanism from the first mode to the second mode.

Another aspect of the invention provides a method for positioning an object in a direction transverse to a first direction in which the object is being carried. The method comprises: carrying an object in the first direction; engaging the object with a guide mechanism and moving the guide mechanism in the first direction with the object. While moving the guide mechanism in the first direction with the object, the method allows the guide mechanism to establish a set position for the object in a second direction transverse to the first direction so that the set position follows a defined trajectory. Upon the guide mechanism reaching a location corresponding to a position of an actuating member, the method prevents the set position from moving in the second direction. The method involves moving the actuating member to the position prior to the guide mechanism reaching the location.

Further aspects of the invention and features of various example embodiments of the invention are described below.

BRIEF DESCRIPTION OF THE DRAWINGS

In drawings which illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

This invention relates to a system for positioning objects in a direction transverse to a direction in which the objects are being carried. The invention has particular application in positioning elongated objects in a longitudinal direction while the objects are being carried in a generally transverse direction. The invention is described herein using, as an example, systems for positioning lumber. However, the invention has broader application and is not limited to application in lumber positioning systems.

A system according to the invention includes a conveyor, for example a transfer deck, for moving pieces of lumber along in a conveyor direction generally transverse to the pieces of lumber. As each piece of lumber is carried along on the transfer deck it engages a guide mechanism. The guide mechanism is initially in a first mode. In the first mode, the guide mechanism causes the piece of lumber to move longitudinally in a predetermined trajectory. While the lumber is engaged with the guide mechanism and the guide mechanism is in the first mode, the longitudinal position of the lumber is a function of the position of the lumber in the conveyor direction.

The guide mechanism also has a second mode wherein the piece of lumber that it engages is not moved longitudinally. The system operates by switching the guide mechanism from the first mode to the second mode when the lumber is in a desired longitudinal position.

The system includes an actuating member that can be positioned by a controller. The position of the actuating member determines where the piece of lumber will be in the conveyor direction (and therefore what the longitudinal position of the lumber will be) when the guide mechanism is switched from the first mode to the second mode.

Figure 1:
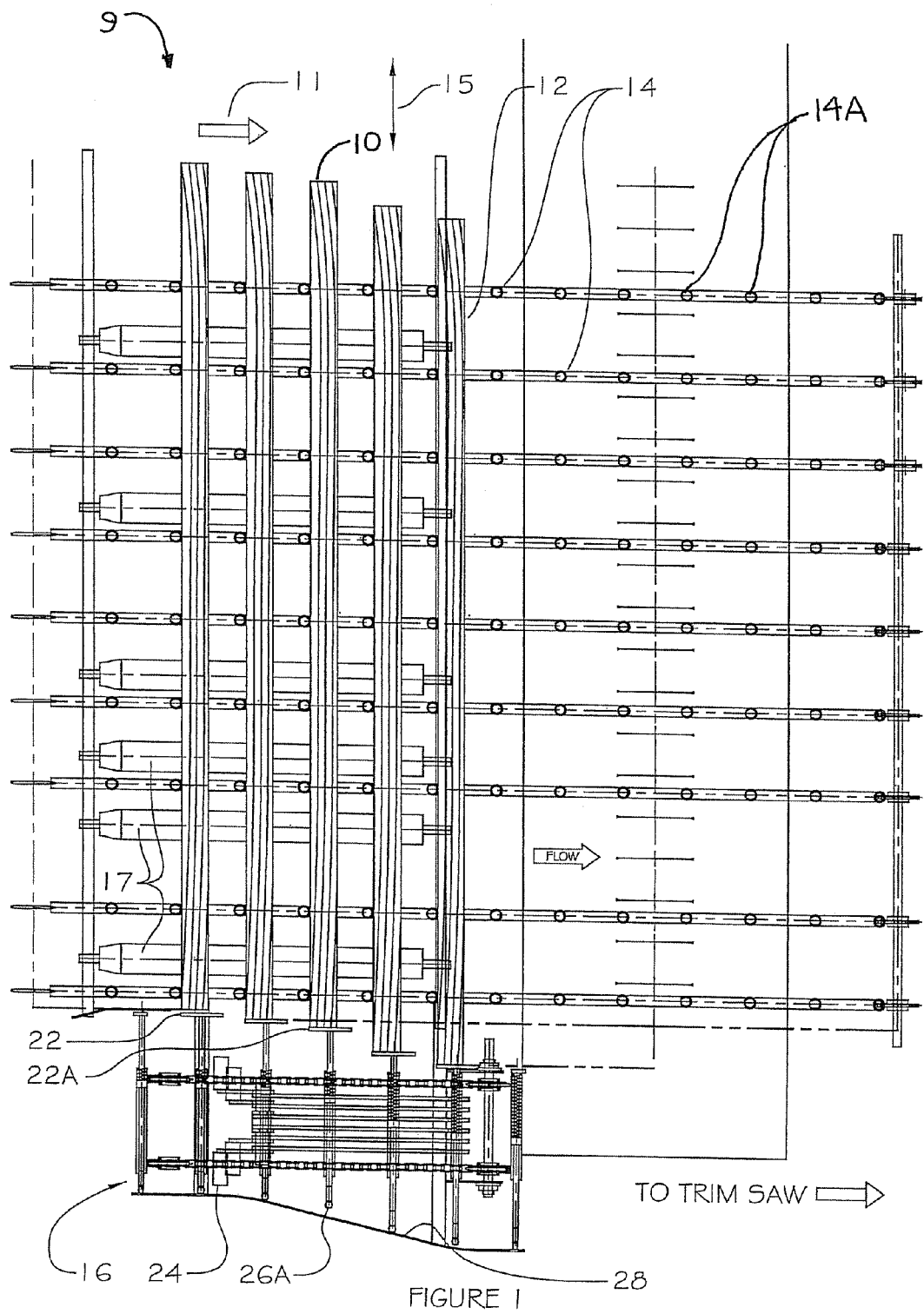
FIG. 1 is a partly schematic view of an example lumber positioning system according to one embodiment of the invention.

FIG. 1 shows an example system 9 according to one embodiment of the invention. In system 9, lumber 10 travels in a conveyor direction, indicated by arrow 11, along a deck 12. Deck 12 may comprise a suitable lugged transfer deck, or another suitable conveyor, for example. Lumber 10 is moved along deck 12 by a lugged transfer chain 14. Each piece of lumber 10 is between two lugs 14A of transfer chain 14.

Figure 1A:
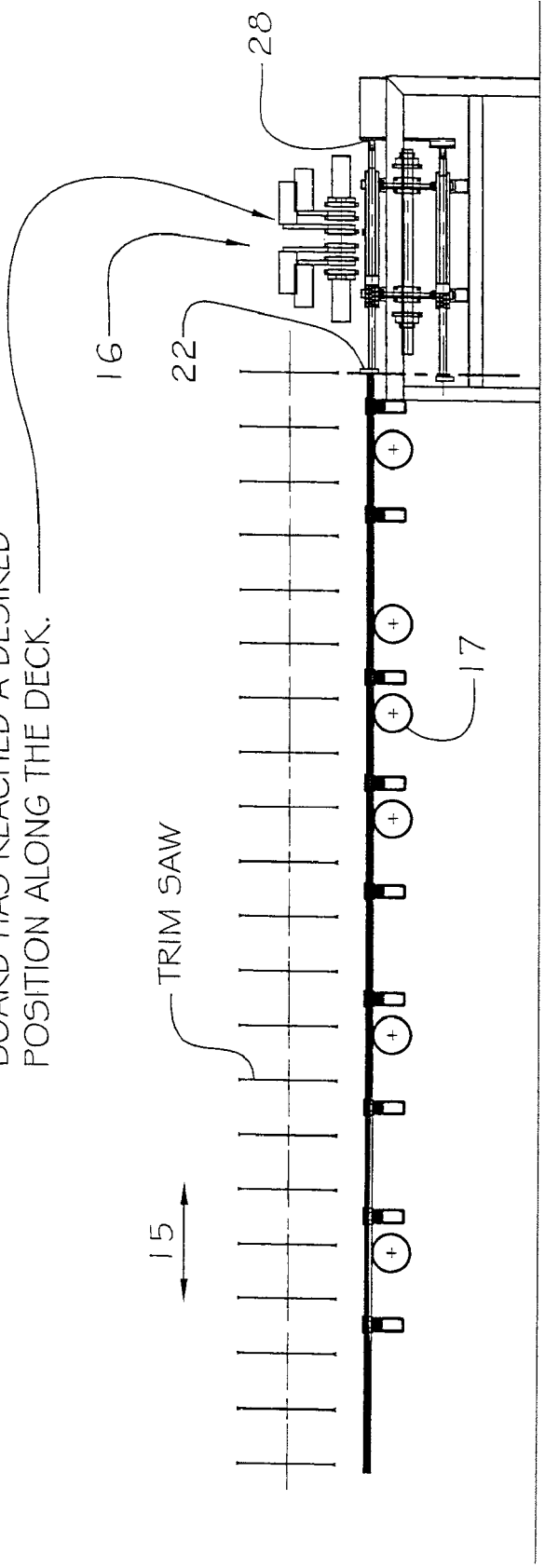
FIG. 1A is a cross-section of a lumber positioning system looking toward a trim saw.

In this example, lumber 10 is being carried to a trim saw. It is desirable to adjust the position of each piece of lumber 10 in a longitudinal direction 15, so that it can be cut in the appropriate places by the trim saw. To accomplish this, lumber 10 is urged in a longitudinal direction against a stop assembly 16. This urging may be done, for example, by rollers 17 (see FIG. 1A) which engage bottom faces of the boards as they slide along deck 12.

Stop assembly 16 provides a stop 22 for each piece of lumber 10. Each stop 22 has a position that can be adjusted in the longitudinal direction.

Figure 2:
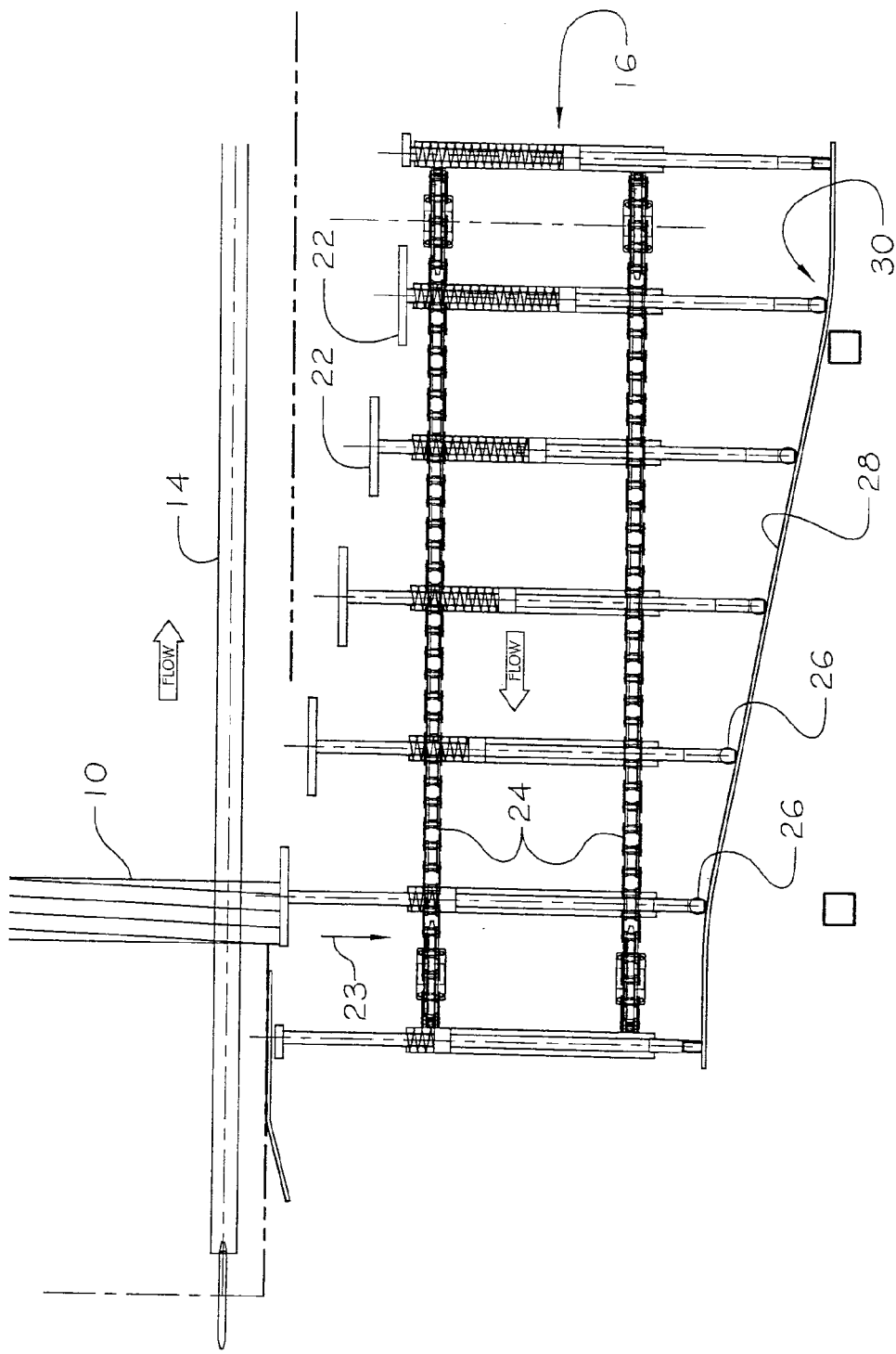
FIG. 2 shows a stop mechanism according to a basic embodiment of the invention.

FIG. 2 shows a stop mechanism 16 according to a basic embodiment of the invention. Stop mechanism 16 has end stops 22, which are mounted to circulate on circulating members. In the illustrated embodiment, the circulating members comprise chains 24. Chains 24 circulate so that end stops 22 move at substantially the same speed as the lugs of transfer chain 14. Therefore, each piece of lumber 10 being carried along transfer chain 14 travels adjacent to one of end stops 22. Rollers 17 cause the end of each piece of lumber 10 to abut against the corresponding end stop 22.

End stops 22 are mounted in a way which permits them to move longitudinally as indicated by arrow 23. As the pieces of lumber 10 are pushed against end stops 22, the end stops 22 tend to slide outwardly in direction 23. End stops 22 are coupled to cam followers 26 which ride along a cam surface 28. Cam followers 26 follow cam surface 28 which defines a trajectory that the end stop 22 will follow as the lumber is carried along deck 12. The end stop 22 sets a position for the end of lumber 10. Where the end of a piece of lumber 10 remains against a corresponding end stop 22 then the lumber 10 follows the trajectory of the end stop 22. If not interfered with, end stops 22 would each continue to follow the trajectory defined by cam surface 28 (i.e move outwardly in direction 23) until the corresponding cam follower 26 reaches the downstream end 30 of stop mechanism 16.

Stop mechanism 16 includes a locking mechanism 20 for each of end stops 22. Locking mechanism 20 permits end stop 22 to be locked so that it no longer can slide outwardly in direction 23. After an end stop 22 is locked, the end of the corresponding piece of lumber 10 is held in the longitudinal position at which the end stop 22 was locked. Since the end stop 22 is no longer free to move in direction 23, cam follower 26 leaves cam surface 28.

Figure 4:
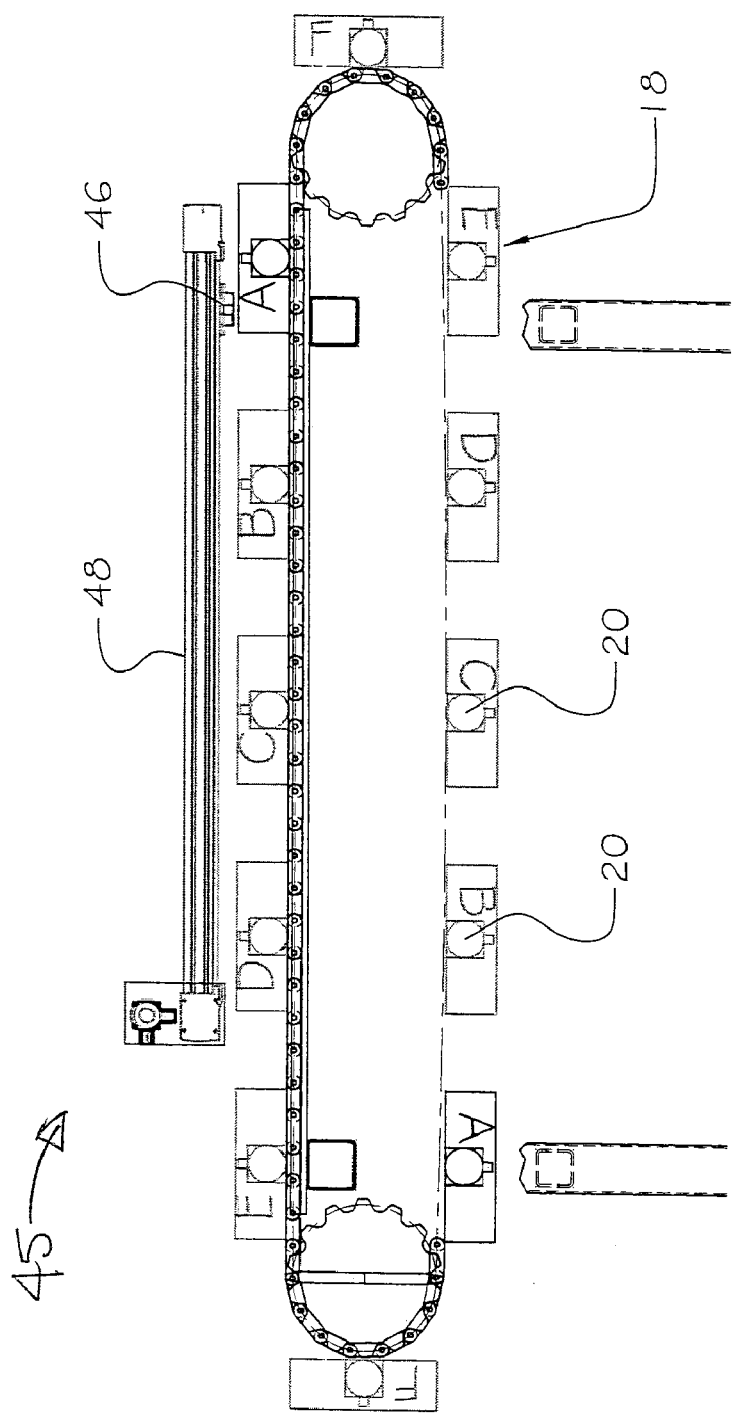
FIG. 4 shows a lumber positioning system wherein an actuating member is positionable by means of a linear actuator.
Figure 5:
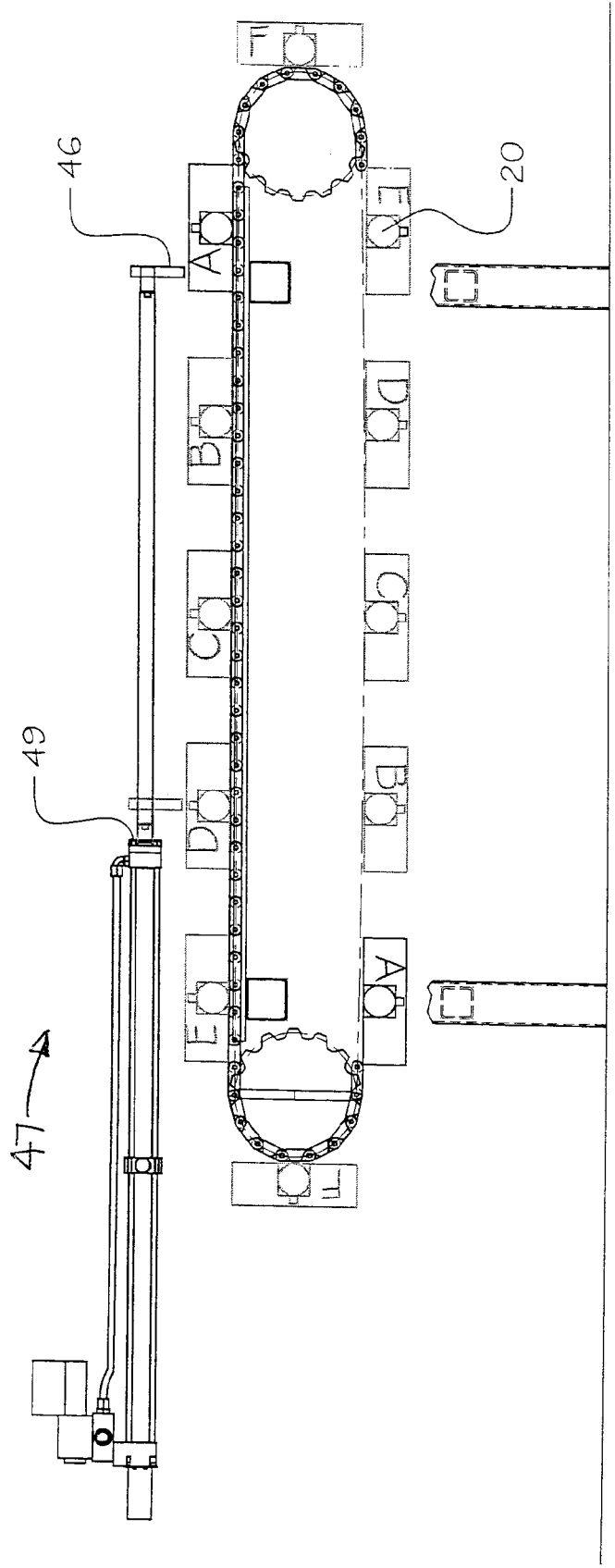
FIG. 5 shows a lumber positioning system wherein an actuating member is positionable by means of a pneumatic or hydraulic cylinder.
Figure 6:
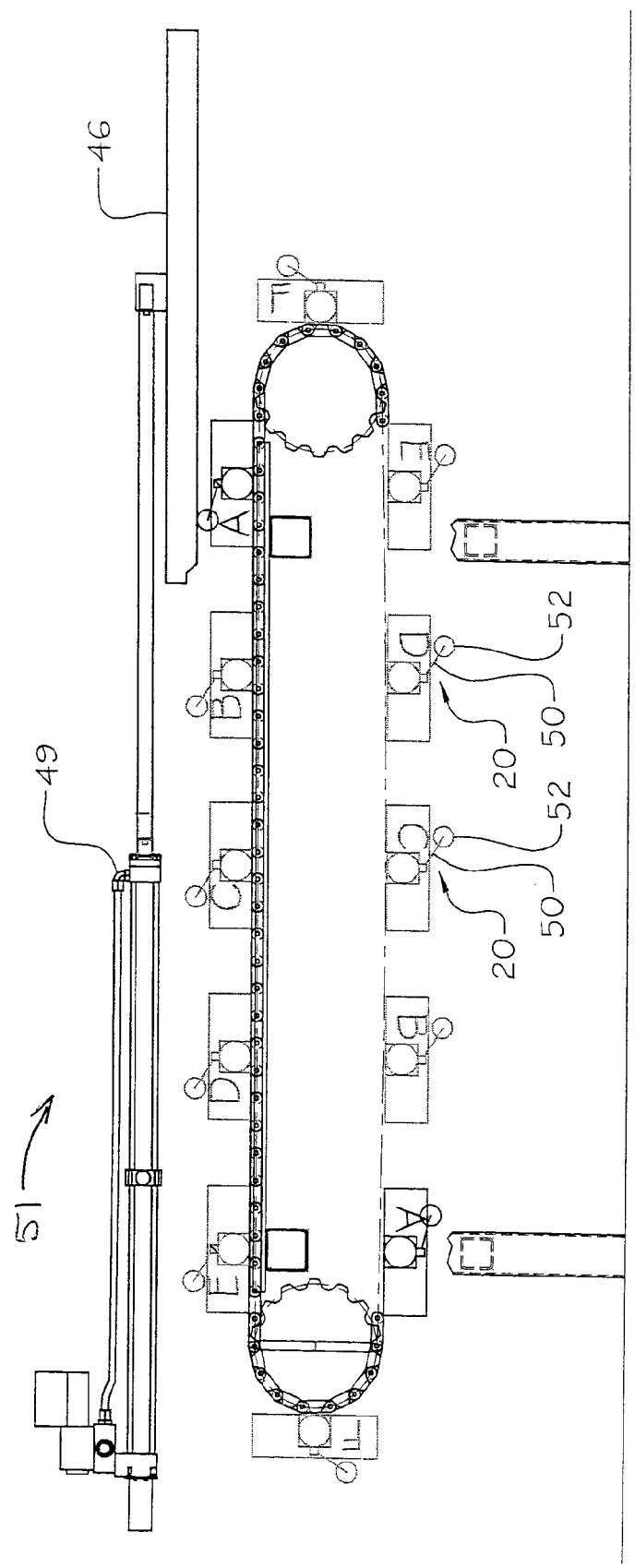
FIG. 6 shows an arrangement for activating locking mechanisms in a lumber positioning system wherein each locking mechanism is activated by pressing down a lever.

In FIG. 1, the locking mechanism (locking mechanism 20 is indicated in FIGS. 4, 5 and 6) of one end stop 22A has been locked so that follower 26A has been carried off of cam surface 28. Whether or not locking mechanism 20 is actuated, end stop 22 continues to move in the direction of the flow of lumber 10 along deck 12 (i.e. in a conveyor direction)

It can be appreciated that, while the locking mechanism 20 for an end stop 22 is unlocked, the end stop can be considered to be in a first mode wherein it sets a longitudinal position for a piece of lumber so that the lumber moves longitudinally according to a trajectory determined by the profile of cam surface 28. While locking mechanism 20 is locked the end stop can be considered to be in a second mode wherein the position set for the lumber does not move longitudinally.

Stop mechanism 16 includes a mechanism for turning on the locking mechanism 20 when end stop 22 has been carried by chains 24 to a desired distance along cam surface 28 (which corresponds to a desired position of end stop 22 in the longitudinal direction of the lumber). It can be seen that for each position along cam surface 28 there is a corresponding longitudinal displacement of the end stop 22 in outward direction 23. The mechanism for actuating the locking mechanisms 20 triggers the locking mechanisms 20 to lock at the desired position.

Preferably, each locking mechanism 20 is actuated by an actuating member. The longitudinal position at which the end stop will be actuated can be set by positioning the actuating member so that the locking mechanism 20 in question will automatically interact with the actuating member when the end stop 22 is at a desired position. This provides an advantage over most prior end stop mechanisms that the actuating member can be put in the appropriate position to trigger the locking mechanism at any time prior to the end stop 22 reaching the position at which it is desired that the locking mechanism 20 be actuated. Therefore, it is not necessary to closely synchronize the application of a control signal with the motion of lumber 10 along deck 12.

There are a wide variety of locking mechanisms that may be used. For example, each of the locking mechanisms may comprise one or more of a mechanical brake;

a hydraulic brake;

an electrically-operated brake;

a clutch or other disengagement mechanism that ceases a feed to an end stop 22; or the like.

Some example locking mechanisms are described below.

Figure 3:
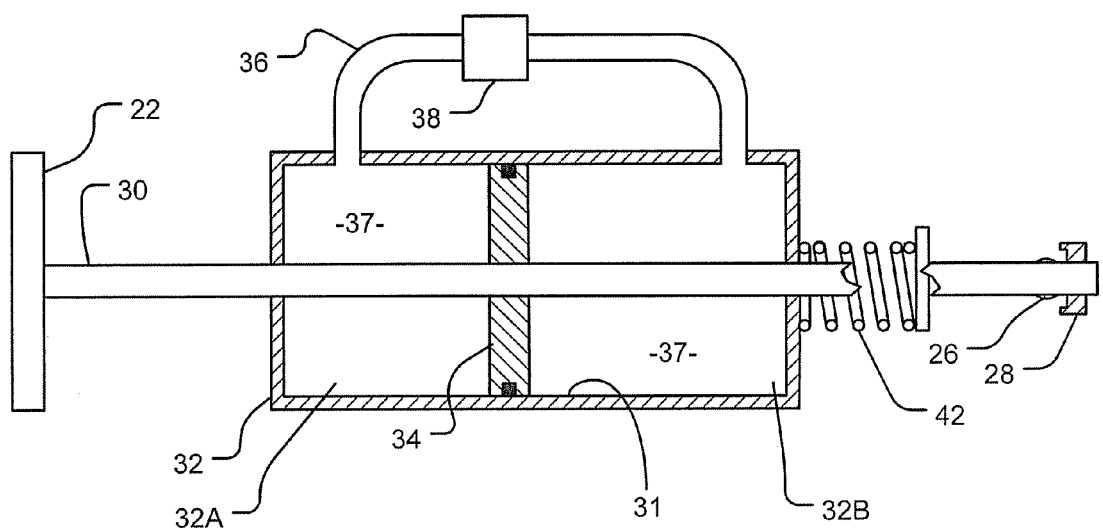
FIG. 3 shows a stop mechanism having a hydraulic locking mechanism.

In one embodiment shown in FIG. 3, each end stop 22 is mounted on a rod 30 of a hydraulic cylinder 32. A piston 34 within hydraulic cylinder 32 is connected to rod 30 and slides with rod 30 in a bore 31 of a cylinder. Hydraulic fluid 37 in hydraulic cylinder 32 can move between the ends 32A, 32B of hydraulic cylinder 32 through a return line 36. Return line 36 includes a valve 38. When valve 38 is closed, the hydraulic fluid cannot flow through return line 36 and, since the hydraulic fluid is relatively incompressible, piston 34 cannot move. This locks end stop 22 in whatever position it was in when valve 38 was closed. A spring 42 urges cam follower 26, located on a far end of rod 30, against cam surface 28.

In alternative embodiments of the invention a locking mechanism may clamp to rod 30 to prevent longitudinal movement of rod 30 when the locking mechanism is engaged.

There are a wide variety of possible mechanisms for actuating a locking mechanism 20. FIG. 4 shows a system 45 wherein an actuating member 46 is carried on a linear actuator 48. System 45 has six channels (A, B, C, D, E and F). A separate actuating member 46 and a separate linear actuator 48 are provided for each channel. Each actuating member 46 can be positioned at any location along the stop mechanism 16 by the corresponding linear actuator 48. A controller (not shown) supplies control signals to move linear actuators 48 to the desired positions. When the corresponding locking mechanism 20 reaches the actuating member 46, the locking mechanism 20 is triggered, thereby preventing further longitudinal motion of the end stop 22.

FIG. 5 shows a system 47 in which locking mechanisms are triggered by actuating members 46. System 47 is similar to system 45 except that linear actuator 48 (FIG. 4) is replaced by a pneumatic or hydraulic cylinder 49 which moves actuating member 46 to the desired position.

FIG. 6 shows a system 51 in which each locking mechanism 20 is activated by pressing down a lever 50 having a roller 52 on its end. The actuating member 46 is elongated and is positioned so that it presses lever 50 down to activate the corresponding locking mechanism 20 when the lever 50 has been carried to a desired position along the stop mechanism 16. In alternative embodiments of the invention, the actuating mechanism could release the lever 50 to engage the locking mechanism 20 when the lever 50 reaches a desired position along stop mechanism 16.

Figure 7:
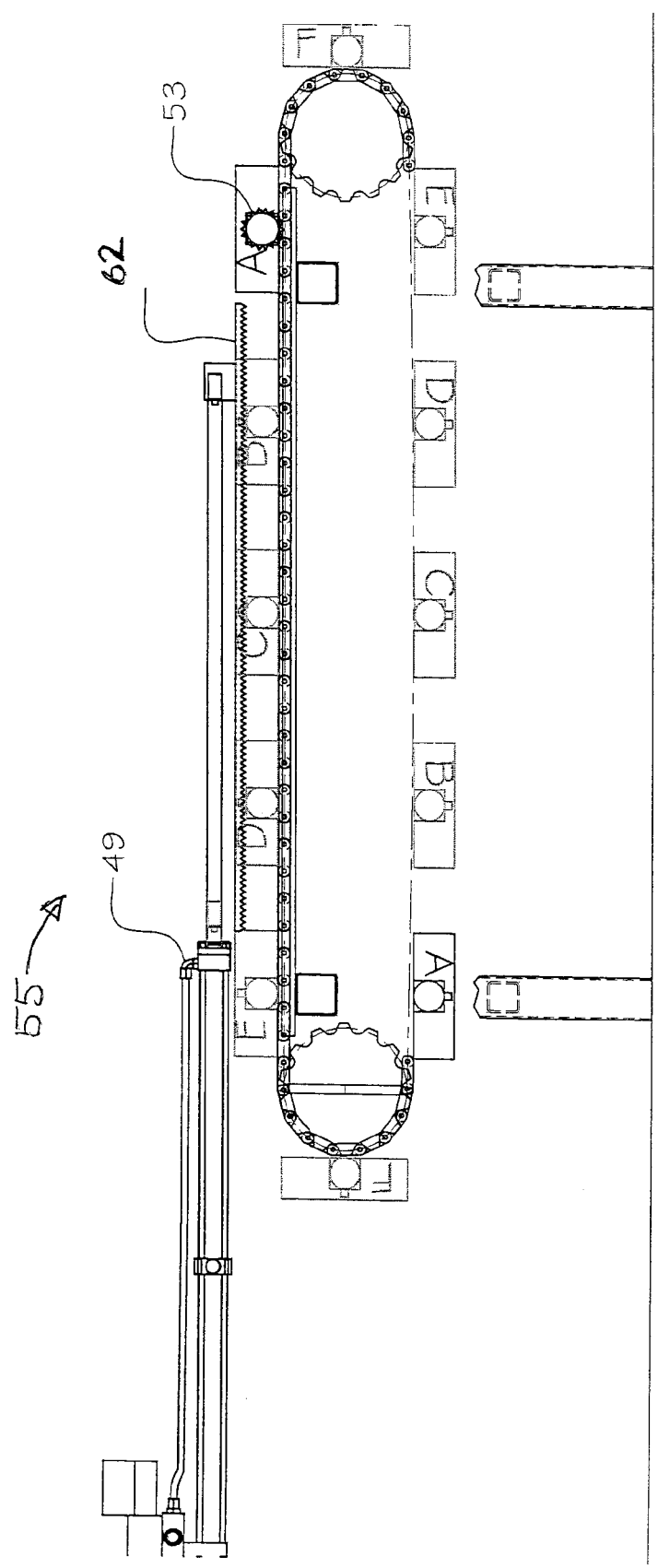
FIGS. 7 and 7A show another alternative system wherein each end stop is mounted on a screw and a location at which the screw stops advancing an end stop is determined by positioning a rack; and, FIG. 8 is a flow chart illustrating an example method according to the invention.
Figure 7A:
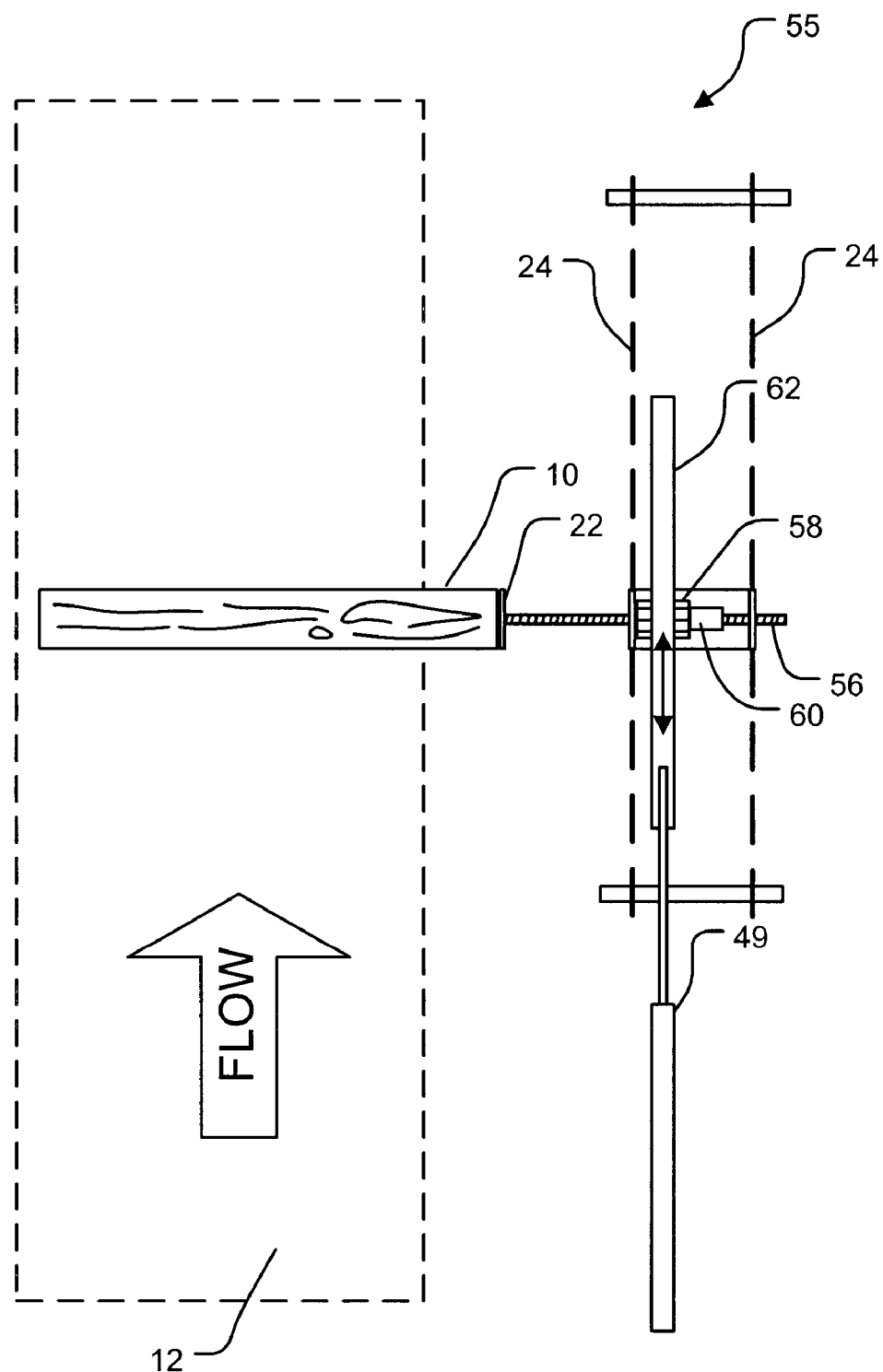

FIGS. 7 and 7A show alternative systems 55 wherein each end stop 22 is mounted on a screw 56. For clarity, only one end stop 22 is shown in FIG. 7A. A pinion 58 drives the rotation of a nut 60 that engages screw 56. As pinion 58 is carried along by chains 24, it is turned by its engagement with a normally stationary rack 62. As nut 60 turns it moves screw 56 longitudinally. Rack 62 does not extend all of the way along stop mechanism 16. Pinion 58 is eventually carried out of engagement with rack 62. At this point there is nothing to drive the rotation of nut 60 and end stop 22 ceases moving longitudinally. The pitch of screw 56 is small enough, and there is enough friction in the system, that the forces exerted by the end of a piece of lumber on screw 56 do not cause nut 60 to turn when pinion 58 is disengaged from rack 62.

Rack 62 can be moved by an actuator such as a hydraulic cylinder 49 to adjust the position at which pinion 58 disengages from rack 62. As each end stop is carried along stop mechanism 16, pinions 58 are originally engaged with a corresponding rack 62 and therefore turn nuts 60 which cause the corresponding stop members 22 to move longitudinally. Rack 62 is positioned so that pinion 58 becomes disengaged from rack 62 when a piece of lumber is at a desired longitudinal position. When this occurs, the pinion 58 stops rotating and the corresponding end stop 22 stays in the longitudinal position it is in when its pinion 58 becomes disengaged from the corresponding rack 62.

A mechanism (not shown) returns stops 22 to their fully retracted positions as the stops 22 are carried back to the upstream end of stop mechanism 16.

An actuating member 46 may interact with a passing control for a locking mechanism (which may be termed a switch mechanism) in any of a wide variety of ways. For example:

The actuating member may move a control member. Relative motion of the actuating member and the control member may cause the control member to be moved to an actuated position as it is carried past the actuating member.

The actuating member may comprise a signal source. The signal source may comprise a source of light, a magnetic field or other signal that is picked up by the control for the locking mechanism when a suitable detector passes the signal source.

The actuating member may comprise an electrical contact that touches a corresponding electrical contact on the control for the locking mechanism to complete an electrical circuit.

The control for the locking mechanism may comprise a proximity sensor, such as a capacitative sensor that detects the proximity of the actuating member.

Figure 8:
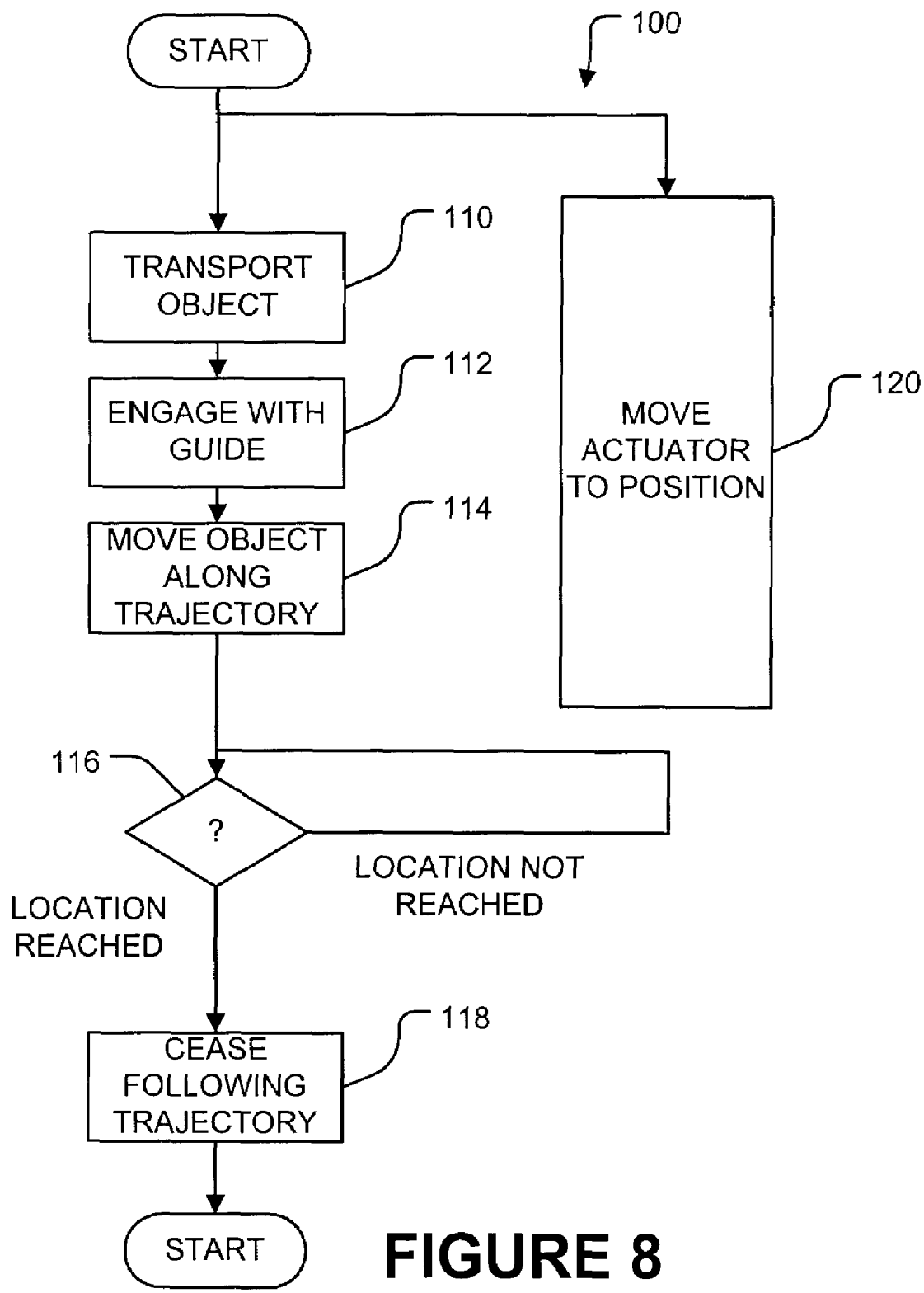

The invention also provides methods for positioning an object in a direction transverse to a first direction in which the object is being carried. FIG. 8 is a flow chart illustrating an example method 100 according to the invention. Method 100 comprises carrying an object in a first direction (block 110). Block 110 may comprise, for example, placing the object, which may be a piece of lumber, on a conveyor, such as a lugged transfer deck. In block 112 the object is engaged with a guide mechanism. The guide mechanism may comprise an end stop, for example. In other embodiments, block 112 comprises clamping a clamp to the object. Engaging the object with the guide mechanism may comprise urging the object against the guide mechanism and/or clamping the object to the guide mechanism.

In block 114 the guide mechanism is moved in the first direction together with the object and, while moving the guide mechanism in the first direction with the object, the guide mechanism moves the object in a second direction transverse to the first direction. The result of block 114 is that the object follows a defined trajectory. The position of the object in the second direction is a function of the position of the object in the first direction. The defined trajectory relates the position of the object in the second direction to the position of the object in the first direction.

In block 116 the guide mechanism reaches a location corresponding to a position of a movable actuating member. In response, in block 118, the guide mechanism is prevented from continuing to move the object along the trajectory. For example, block 118 may prevent the guide mechanism from moving the object in the second direction. Block 118 may comprise, for example, actuating a locking mechanism, such as a brake, or stopping operation of a mechanism for moving the guide mechanism.

Block 120 is performed at any point prior to the guide mechanism reaching the location. Block 120 comprises moving the actuating member to a position which is selected to correspond to the location at which the object should stop following the trajectory. Block 120 may, for example, comprise operating an actuator under control of a controller to move the actuating member to the position. The controller determines the position of the actuating member which corresponds to a desired position of the object in the second direction. In some embodiments, the object is a piece of lumber and the controller selects the position of the actuating member in response to the output from a lumber optimization system that determines one or more locations at which a piece of lumber should be cut.

As will be apparent to those skilled in the art in the light of the foregoing disclosure, many alterations and modifications are possible in the practice of this invention without departing from the spirit or scope thereof. For example:

In the embodiments of the invention described above, the object being moved (i.e. the piece of lumber) is biased toward a stop member 22. The board is biased toward the stop 22 by a mechanism such as roller 17. The force exerted by the board on stop 22 keeps the board engaged with stop 22 and, in some embodiments, drives motion of stop 22 in direction 23. In alternative embodiments of the invention, stop 22 could include a mechanism that grips the board 10 or other object and pushes or pulls the board or other object into the desired longitudinal position.

An object being moved may be pushed in the longitudinal direction by a stop mechanism rather than being biased toward the stop.

An object may be biased toward the stop by gravity by providing an inclined conveyor.

Instead of, or in addition to, moving an actuating member to change a location at which a stop mechanism changes modes, as described above, apparatus according to the invention may function by moving an actuating member to change a location at which a stop member starts. When this is done, the location where the operating mode of the stop mechanism changes (e.g. the location where the stop member ceases to follow a trajectory) can be fixed. For example, apparatus may be designed so that an actuator may move cam surface 28 back and forth in a direction generally parallel to the direction of arrow 11 and/or an actuator may be provided to cause a distance between end stop 22 and cam follower 26 to be set to a desired value before the stop mechanism reaches the location at which the operating mode of the stop member changes.

What is claimed is:

1. Apparatus for positioning objects that are extended in a longitudinal direction, the apparatus comprising:
   a conveyor for carrying the elongated objects in a conveyor direction generally transverse to the longitudinal direction;
   a guide mechanism disposed to interact with one of the elongated objects as the elongated object is moved in the conveyor direction,
   the guide mechanism having a first mode wherein the guide mechanism sets a longitudinal position for the object, the longitudinal position set by the guide mechanism being a function of a position of the object in the conveyor direction;
   the guide mechanism having a second mode wherein the longitudinal position for the object set by the guide mechanism does not change as the object moves in the conveyor direction;
   the guide mechanism comprising a switch mechanism connected to switch the guide mechanism from the first mode to the second mode, the switch mechanism moving along a path as the object moves in the conveyor direction; and,
   an actuating member located to interact with the switch mechanism at a point that is movable along the path of the switch mechanism, the position of the actuating member along the path determining a location at which the switch mechanism operates to switch the guide mechanism from the first mode to the second mode.

2. Apparatus according to claim 1 wherein:
the guide mechanism comprises a stop member; and,
in the first mode, the guide mechanism moves the stop member along a trajectory such that a longitudinal position of the stop member is a function of a position of the stop member in the conveyor direction.

3. Apparatus according to claim 2 wherein the guide mechanism comprises means for urging one of the objects against the stop member.

4. Apparatus according to claim 2 comprising one or more rollers extending at an angle to the longitudinal direction, the rollers having top surfaces in contact with lower surfaces of the object and being driven in rotation to urge the object against the stop member.

5. Apparatus according to claim 1 wherein the guide mechanism comprises:
a plurality of stop members spaced apart from one another in the conveyor direction and carried on a circulating member adjacent to the conveyor, the stop members movable in a longitudinal direction at least substantially transverse to the conveyor direction,
a drive connected to drive the circulating member to carry the plurality of stop members in the conveyor direction at a rate substantially equal to a rate at which the conveyor carries the object in the conveyor direction; wherein:
the switch mechanism is one of a plurality of independent switch mechanisms, each corresponding to one of the stop members;
the actuating member is one of a plurality of independently-movable actuating members each corresponding to one of the switch mechanisms; and,
the apparatus comprises a plurality of locking mechanisms, one of the locking mechanisms associated with each of the stop members, the locking mechanisms operable to lock position of the corresponding stop member in the longitudinal direction upon actuation of the corresponding switch mechanism by interaction with the corresponding actuating member.

6. Apparatus according to claim 5 comprising:
a controller; and,
a plurality of actuators, the actuators setting a position of each of the plurality of actuating members in response to control signals issued by the controller.

7. Apparatus according to claim 6 wherein the controller comprises a processor configured to:
receive information specifying a longitudinal position of the object;
determine a desired position for one of the actuators corresponding to the object based at least in part upon the specified longitudinal position for the object; and,
issue control signals to cause the corresponding actuator to move the corresponding actuating member to the desired position.

8. Apparatus according to claim 7 comprising a cam surface, wherein each of the stop members is coupled to a corresponding cam follower and has an associated bias mechanism that biases the cam follower against the cam surface.

9. Apparatus according to claim 8 wherein the cam surface has a shape that causes the stop members to move away from a centerline of the conveyor as the stop members are carried in the conveyor direction.

10. Apparatus according to claim 8 wherein the cam surface is arranged beside and extending along a portion of the conveyor and the cam surface diverges from the conveyor in a downstream direction.

11. Apparatus according to claim 1 wherein the guide mechanism comprises:
a cam follower;
a bias mechanism urging the cam follower against a cam surface; and,
a mechanism for moving the cam follower in the conveyor direction.

12. Apparatus according to claim 11 wherein the cam surface is arranged so that motion of the cam follower in the conveyor direction tends to move the cam follower away from the cam surface.

13. Apparatus according to claim 12 comprising an object-contacting member coupled to the cam follower, wherein a position of the object-contacting member in a longitudinal direction transverse to the conveyor direction defines the longitudinal position set for the object and, at least when the guide mechanism is in the first mode, the object-contacting member moves in the longitudinal direction in response to motion of the cam follower.

14. Apparatus according to claim 12 wherein the switch mechanism is configured to actuate a locking mechanism upon interaction with the actuating member, the locking mechanism, when actuated, preventing motion of the object-contacting member in the longitudinal direction.

15. Apparatus according to claim 1 wherein the guide mechanism comprises an end stop coupled to a longitudinally-movable member and a locking mechanism
wherein switching the guide mechanism from the first mode to the second mode operates the locking mechanism to prevent longitudinal movement of the longitudinally-movable member.

16. Apparatus according to claim 15 wherein the locking mechanism comprises:
a piston coupled to the longitudinally-movable member and slidably disposed within a cylinder, the piston dividing an interior of the cylinder into first and second fluid-filled volumes;
a conduit extending between the first and second volumes; and,
a valve operable to block fluid from flowing through the conduit.

17. Apparatus according to claim 15 wherein the locking mechanism comprises a hydraulic mechanism.

18. Apparatus according to claim 15 wherein the switching mechanism comprises an electrical switch and the locking mechanism comprises an electrically-operated brake connected to be controlled by the electrical switch.

19. Apparatus according to claim 1 wherein the switch mechanism is mounted to a circulating element and comprises a mechanism for driving the circulating element to circulate.

20. Apparatus according to claim 19 wherein the circulating element carries the switch mechanism at a rate equal to a rate at which the conveyor carries the object in the conveyor direction.

21. Apparatus according to claim 20 wherein the path is substantially parallel to the conveyor direction.

22. Apparatus according to claim 1 wherein the switch mechanism is carried on a circulating chain and the apparatus comprises a drive mechanism connected to drive the chain to circulate.

23. Apparatus according to claim 1 wherein the switch mechanism comprises a movable control member and the actuating member is disposed to interact with the control member so that the control member moves from a first position to a second position upon the control member reaching the point along the path.

24. Apparatus according to claim 23 comprising a valve operated by movement of the control member between its first and second positions.

25. Apparatus according to claim 2 comprising means for feeding the stop member toward or away from the conveyor as the stop member is moved in the conveyor direction wherein the switch mechanism is configured to cease operation of the means for feeding the stop member.

26. Apparatus according to claim 25 wherein the means for feeding the stop member toward or away from the conveyor comprises a screw threadedly engaged with a nut and a means for rotating the screw relative to the nut.

27. Apparatus according to claim 1 comprising a trim saw located at a downstream end of the conveyor, the trim saw cutting the object at one or more positions along the object, the positions determined at least in part by the location at which the switch mechanism operates to switch the guide mechanism from the first mode to the second mode.

28. Apparatus according to claim 27 wherein the conveyor comprises a lugged transfer deck.

29. Apparatus for positioning objects that are extended in a longitudinal direction, the apparatus comprising:

a conveyor for carrying the elongated objects in a conveyor direction generally transverse to the longitudinal direction;

a guide mechanism disposed to interact with one of the elongated objects as the elongated object is moved in the conveyor direction;

the guide mechanism having a first mode wherein the guide mechanism moves the object longitudinally along a trajectory such that a longitudinal position of the object is a predetermined function of a position of the object in the conveyor direction;

the guide mechanism having a second mode wherein the guide mechanism does not move the object longitudinally;

the guide mechanism comprising a switch mechanism connected to switch the guide mechanism from the first mode to the second mode, at least the switch mechanism moving in the conveyor direction at the same rate as the object; and, an actuating member located to interact with the switch mechanism and movable in the conveyor direction, the position of the actuating member in the conveyor direction determining a location at which the switch mechanism operates to switch the guide mechanism from the first mode to the second mode.

30. A method for positioning an object in a direction transverse to a first direction in which the object is being carried, the method comprising:

carrying an object in the first direction;

engaging the object with a guide mechanism and moving the guide mechanism in the first direction with the object;

while moving the guide mechanism in the first direction with the object, allowing the guide mechanism to set a set position for the object in a second direction transverse to the first direction so that the set position follows a defined trajectory;

upon the guide mechanism reaching a location corresponding to a position of an actuating member, preventing the set position from moving in the second direction; and, prior to the guide mechanism reaching the location, moving the actuating member to the position.

* * * * *